United States Patent

Ramm et al.

[11] Patent Number: 5,813,940
[45] Date of Patent: Sep. 29, 1998

[54] TRANSMISSION CLUTCH CONTROL ARRANGEMENT

[75] Inventors: Norbert Ramm; Frank Zimmermann, both of Braunschweig, Germany

[73] Assignee: Volkswagen AG, Wolfsburg, Germany

[21] Appl. No.: 841,116

[22] Filed: Apr. 29, 1997

[30] Foreign Application Priority Data

May 23, 1996 [DE] Germany .................. 196 20 742.8

[51] Int. Cl.⁶ ................................................ B60K 23/02
[52] U.S. Cl. ............................................. 477/93; 477/176
[58] Field of Search .................... 477/93, 114, 176; 701/56

[56] References Cited

U.S. PATENT DOCUMENTS

| | | | |
|---|---|---|---|
| 4,466,311 | 8/1984 | Hiramatsu | 74/866 |
| 4,603,604 | 8/1986 | Nishikawa et al. | 477/114 |
| 4,648,289 | 3/1987 | Kubo et al. | 74/866 |
| 4,667,787 | 5/1987 | Hofmann | 192/32 |
| 4,716,790 | 1/1988 | Sawada et al. | 74/866 |
| 4,869,474 | 9/1989 | Best et al. | 267/136 |
| 4,884,667 | 12/1989 | Koga | 192/3.55 |
| 5,067,599 | 11/1991 | Roder et al. | 477/176 |
| 5,176,234 | 1/1993 | Reik et al. | 192/52 |
| 5,403,250 | 4/1995 | Juergens | 477/176 |
| 5,439,425 | 8/1995 | Ramm et al. | 477/74 |
| 5,535,863 | 7/1996 | Vukovich et al. | 477/176 |
| 5,549,525 | 8/1996 | Wendel | 477/93 |

FOREIGN PATENT DOCUMENTS

| | | |
|---|---|---|
| 2922030 | 12/1979 | Germany . |
| 3809118 | 10/1988 | Germany . |
| 3827307 | 2/1989 | Germany . |
| 3920245 | 1/1990 | Germany . |
| 61-211548 | 9/1986 | Japan . |
| 62-225427 | 3/1987 | Japan . |
| 3009161 | 1/1991 | Japan . |
| 2197049 | 5/1988 | United Kingdom . |

*Primary Examiner*—Dirk Wright
*Attorney, Agent, or Firm*—Baker & Botts, L.L.P.

[57] ABSTRACT

An arrangement for the controlled engagement and disengagement of a clutch in the transmission of a motor vehicle drive system includes an engine and an automatic transmission which can be activated electro-hydraulically. In order to avoid "stationary-state shaking", a preselected value for the clutch slip torque is determined as a function of a prehistory of limited duration in the form of an evaluation of the speed profile of the motor vehicle in the immediate past.

21 Claims, 1 Drawing Sheet

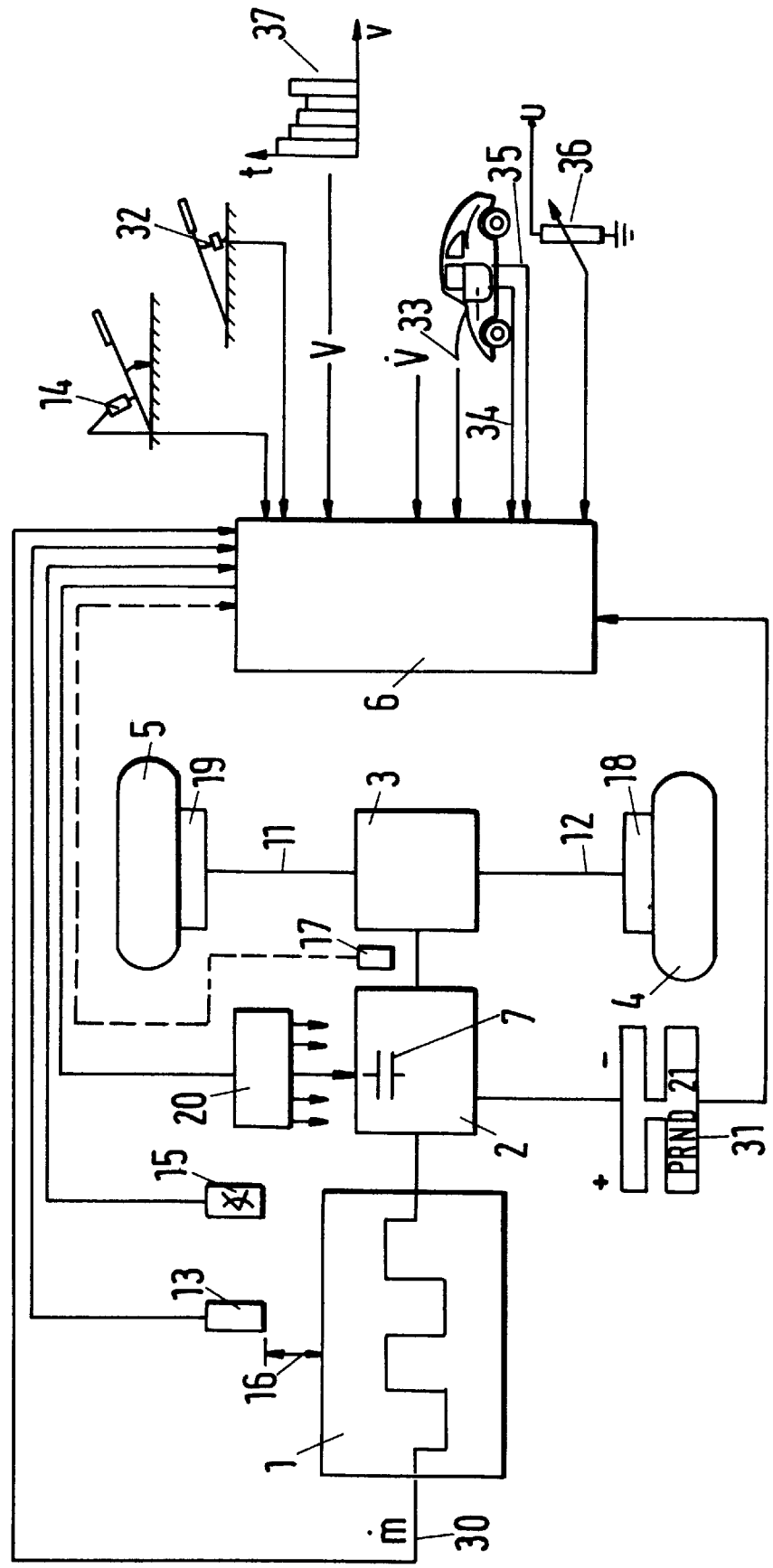

TRANSMISSION CLUTCH CONTROL ARRANGEMENT

BACKGROUND OF THE INVENTION

This invention relates to a method for controlling the engagement and disengagement transmission of the clutch in a motor vehicle based upon detected torque between the motor vehicle drive train and the vehicle body and to an arrangement for carrying out the method.

U.S. Pat. No. 5,439,425 discloses an arrangement for controlling engagement of a clutch in the transmission of a motor vehicle in such a way as to help in avoiding so-called stationary shaking which occurs when a vehicle with an automatic transmission is in a stationary state with a gear engaged and the drive wheels braked. The cause of these vibrations, which the driver finds unpleasant, is the torque bias of the drive train, including the engine and the automatic transmission, in relation to the vehicle body, the drive train being unable, when idling, to pass on to the vehicle wheels the propulsion power provided by the engine.

In the arrangement disclosed in U.S. Pat. No. 5,439,425, the displacement of a drive train component in relation to the vehicle body is used as a control. When the motor vehicle is in a stationary state and a gear is engaged and the drive wheels are braked, or when the motor vehicle is in a stationary state with no gear engaged, or when the motor vehicle is decelerating to a standstill with a gear engaged and when a the vehicle is operated below a specified speed threshold and load threshold, the control pressure applied to the clutch in the transmission is set by a transmission control computer in such a way that, when a defined clutch output torque is exceeded, the clutch begins to slip, producing a clutch slip torque or "creeping toque". In this condition the displacement of the drive train component in relation to the vehicle body can be measured directly or else bearing forces in the engine bearing or the engine torque are measured and the displacement is determined indirectly.

In a preferred embodiment of the above-described arrangement, the level of the clutch slip torque i.e., the creeping torque, can be preselected and stored as a characteristic variable in the transmission control computer.

During operation of the above-described arrangement it has become apparent that it would be desirable to be able to set preselected values for the clutch slip torque automatically as a function of specific operating states of the motor vehicle. The clutch slip torque transmitted by the clutch is available as creeping torque, i.e., the known effect in which a motor vehicle with an automatic transmission begins to "creep" as soon as the driver releases the brake with a gear engaged. The creeping torque which occurs in this way can be troublesome in many cases, but in other cases, for example, when maneuvering in a parking space or when driving into a garage, it is, within certain limits, beneficial to be able to allow the vehicle to "creep".

SUMMARY OF THE INVENTION

Accordingly it is an object of the present invention to provide a stationary state transmission control arrangement which overcomes disadvantages of the prior art.

Another object of the invention is to provide a stationary state transmission control arrangement in which various operating states of the motor vehicle are detected automatically and a preselected value for the clutch torque is assigned to each of the operating states.

These and other objects of the invention are attained by determining a preselected value for the clutch slip torque as a function at least in part of the immediate past history of the operation of the motor vehicle, including an evaluation of the speed profile of the motor vehicle.

The immediate past is understood here to be the period immediately before the transmission clutch control arrangement is used, for example, the stationary state of the vehicle. "At least in part" is understood here to mean that, in addition to the immediately preceding speed profile, there may be other factors which influence the preselected value.

It has become apparent that the evaluation of the speed profile of a vehicle is capable of providing reliable criteria to indicate whether the vehicle is in an "urban cycle" operating mode or in an "acceleration", "backed-up traffic" or "parking or maneuvering" operating mode.

In order to distinguish among these various operating modes, there may, in particular, be provision for the preselected value for the clutch slip torque to be determined from the relationship between the averaged vehicle speeds, the maximum values of the vehicle speeds and the duration of stationary-state times.

The assessment of the travel situation is therefore made by a classification of the vehicle speed profile during a prescribed, variable immediately preceding time period. The relationship between the averaged vehicle speed, maximum speed values and the duration of stationary-state times then determines the selection of a preselected value for the clutch slip torque.

Preferably, the "urban cycle" condition is evaluated so that, when the vehicle stops, the transmission control computer applies or sets the clutch slip torque for the minimum tendency to creeping. As a result, use is made in particular of the positive effect of the conventional method described above according to which so-called "stationary-state shaking" is eliminated when the vehicle stops because the clutch slip torque is set at a minimum.

If the brake is released during the urban cycle, the clutch slip torque is kept at the low value set by the transmission control computer. As soon as the control unit detects an activation of the accelerator pedal, the clutch pressure is raised again to the appropriate characteristic diagram value in accordance with the deflection of the accelerator pedal to provide values for the vehicle speed and the acceleration which can be calculated from the characteristic diagram.

The "backed-up traffic" condition is preferably detected according to the invention when the average vehicle speed decreases, and the stationary-state times are simultaneously increased. The preselected clutch slip torque which is assigned to this condition is higher than for the urban cycle condition and is adjusted only slowly after a selected delay period to what was previously the lowest value of the clutch slip torque.

In this connection, the duration of the delay period until the reduction in clutch slip torque occurs can preferably also be determined from the vehicle speed profile. The higher set value for the clutch slip torque in comparison with the "urban cycle" operating mode allows for the fact that, when the vehicle is slowly traveling forward a slight degree of creeping of the vehicle during idling is appropriate.

In addition, the position of the selector lever of an electro hydraulically activated automatic transmission may be detected by a corresponding switch. If the transmission control computer detects through this switch that the selector lever is moved out of a forward position into the reverse position, this is evaluated as a so-called parking or maneuvering procedure. In this case, the preselected value for the clutch slip torque is set at a comparatively high level, i.e., the maximum level in order to permit the use of a high degree of creeping without depression of the accelerator pedal.

According to the invention, the usual high preselected value for the clutch slip torque in the drive train may be maintained for a controllable time period and then subsequently continuously reduced again to the minimum value of the clutch slip torque.

If a change in the selector lever position between "D", "R" and "D" is detected in rapid succession with a predetermined time limit, the shift elements for the respective direction of travel are changed using an increased clutch pressure.

In addition, the preselected value of the creeping torque may be determined in a manner which can be selected individually by the driver by an analog control element or a functionally equivalent sensing device. An advantageous embodiment can comprise, for example, the use of a so-called TIP Tronic Selector Device in the vehicle. Below a given vehicle speed, and when the stationary-state disengaging element is activated, the setting of the shift positions "+" and "−" is used to adjust the set value of the creeping torque.

In particular, for safety reasons, the stationary-state disengagement routine may be interrupted as soon as the transmission control computer detects that one of the following conditions has occurred: a set contact switch in the driver's seat is closed, indicating an unoccupied vehicle; one or more door contact switches are closed, meaning a person has just left, or entered, a vehicle; an engine hood switch is closed, likewise indicating that the vehicle is not in a satisfactory travel condition.

In all of these situations according to the invention, the clutch is completely opened or set to a minimum clutch slip torque value and cannot be closed by activating the accelerator. In addition, the driver can be informed of this condition by a warning device. This safety state is not terminated until the service brake has been activated again and the seat, door and hood switches are all open.

BRIEF DESCRIPTION OF THE DRAWINGS

Further objects and advantages of the invention will be apparent from a reading of the following description in conjunction with the accompanying drawing which is a schematic diagram illustrating a representative embodiment of the invention.

DESCRIPTION OF PREFERRED EMBODIMENTS

The typical embodiment of the invention shown in the drawing includes an engine 1 and an automatic transmission 2 which are fixedly flanged to each other and connected to a vehicle body by resilient mountings. The transmission is coupled through a main drive shaft to a differential 3 from which two wheel drive shafts 11 and 12 lead to corresponding drive wheels 5 and 4 having corresponding wheel brakes 19 and 18, respectively. The internal combustion engine 1 drives the rear wheels 4 and 5 of the motor vehicle using a clutch 3 in the automatic transmission 2. For further details regarding the structure and operation of the vehicle, reference may be made to U.S. Pat. No. 5,439,425, the disclosure of which is incorporated herein by reference.

In order to avoid stationary-state shaking, an electro-hydraulic, electro-pneumatic or electromagnetic clutch control unit 20 is provided to control the frictional engagement of the clutch, which can be reduced or increased as a function of commands generated in a transmission control computer 6. At the same time, a preselected value for the clutch slip torque which the wheel brakes 18 and 19 for the drive wheels 4 and 5 must resists in the stationary state is generated in the transmission control computer 6. A displacement sensor 13 detects displacement of a component of the drive train which includes the internal combustion engine 1 and automatic transmission 2. As is explained in more detail in U.S. Pat. No. 5,439,425, a conventional torque sensor 17 may take the place of the displacement sensor 13 for detecting stationary state vibrations.

In addition, a sensor 30 is provided to detect the rotational speed of the internal combustion engine 1, a sensor 31 determines the position of the selector lever of the automatic transmission 2, and a switch 32 for the handbrake lever, an engine hood switch circuit 33, a seat contact switch circuit 34, one or more door switch circuits 35 and a potentiometer 36 which can be activated by the driver, or an equivalent device are also provided.

The reference symbol 37 designates the diagrammatic symbolic representation of the classification of the speed profile of the vehicle during the immediately preceding travel time.

The transmission control computer 6, which is described in the above-cited patent, is arranged to detect the speed profile during a preceding time period, for example 10 minutes. In this context, the speed classification may be made, for example, in a series of steps, such as 0 to 2 km/h, 2 to 10 km/h, 10 to 15 km/h, 15 to 20 km/h, etc.

As already described, a determination of the operating mode is made from the classification of the speed profile.

Further monitoring of the position of the selector lever by an appropriate switching arrangement 31 permits the "parking and maneuvering" operation status to be detected.

The seat switch, hood switch and door switch circuits 33, 34 and 35 respectively, serve as safety arrangements in order to exclude, in the form of plausibility monitoring, conditions which cannot be satisfactory travel conditions for the vehicle under any circumstances.

The potentiometer 36, or an equivalent device, for example in the form of key buttons and subsequent evaluation in a control unit, enables the driver to control the preselected value for the clutch slip torque.

Although the invention has been described herein with reference to specific embodiments, many modifications and variations therein will readily occur to those skilled in the art. Accordingly, all such variations and modifications are included within the intended scope of the invention.

WE CLAIM:

1. A method for controlling engagement of a clutch to which engagement pressure is applied in the transmission of a drive system for a motor vehicle which includes a body, drive wheels, a drive system including an automatic transmission containing a clutch transmission, a control system and an arrangement for generating a signal representing at least one of: (a) a torque bias between a component of the drive system and the vehicle body; (b) a displacement distance between the drive system and the vehicle body; (c) an output torque of the transmission; and (d) a supporting force in the support bearings of a component of the drive system, and supplying the signal to the transmission control system comprising:

setting the control pressure on the clutch in the transmission (a) when the motor vehicle is in a stationary state, a gear is engaged and driven wheels are braked, or (b) when the motor vehicle in a stationary state with no gear engaged, or (c) when the motor vehicle is decelerating to a standstill with a gear engaged and when the vehicle speed and load are below specified thresholds as a function of the torque bias in such a way that, when a preselected clutch slip torque value is exceeded, the clutch begins to slip;

wherein the preselected value for the clutch slip torque is determined as a function of a prehistory of the vehicle operation during a limited period in the form of an evaluation of an immediately preceding vehicle speed profile.

2. A method according to claim 1 wherein the vehicle speed profile is determined during a prescribed, variable time period immediately preceding stopping of the vehicle.

3. A method according to claim 2 wherein the preselected value for the clutch slip torque is determined from the relationship between the averaged vehicle speeds, the maximum values of the speeds and the duration of stationary-state times during the prehistory time period.

4. A method according to claim 3 wherein, if the result of the evaluation of the vehicle speed profile is an assignment to an "urban cycle" operating mode, the preselected value for the clutch slip torque is reduced until minimum inclination to slipping of the vehicle is effected when the vehicle stops.

5. A method according to claim 4 wherein, after the vehicle stops in the "urban cycle" operating mode, the clutch slip torque is maintained at the minimum inclination to slipping value after the brake is released.

6. A method according to claim 5 wherein the clutch engagement pressure is increased as soon as an "acceleration" operating mode is detected by deflection of an accelerator pedal.

7. A method according to claim 3 wherein, when the mean vehicle speed is reduced and the stationary-state times simultaneously become longer, a "backed-up traffic" operating mode is detected, in which mode a clutch slip torque which is larger than that for an "urban cycle" operating mode is generated as the preselected clutch slip value.

8. A method according to claim 7 wherein, in the "backed-up traffic" operating mode, the preselected value for the clutch slip torque is reduced during a defined time period to the value of the clutch slip torque for an "urban cycle" operating mode.

9. A method according to claim 3 wherein, when a selector lever of an automatic transmission is shifted from a forward position into a reverse position, the transmission control system is shifted into a "parking or maneuvering" operating mode in which the preselected value for the clutch slip torque is set to the highest possible value.

10. A method according to claim 9 wherein a maximum value for the clutch slip torque is maintained over a selected time period and is subsequently reduced to a minimum value of the clutch slip torque when an "urban cycle" operating mode is required.

11. A method according to claim 9 wherein, when a change in the position of the selector lever of the automatic transmission from a forward position to the reverse position in rapid succession with a specified time limit is detected, the shift elements of the automatic transmission for both directions of travel are changed with increased contact pressure.

12. A method according to claim 1 wherein the preselected value for the clutch slip torque can be controlled by a manually activated setting device which is accessible to the driver.

13. A method according to claim 1 wherein, when the vehicle is in a stationary state and a reverse movement of the vehicle is detected, the preselected value for the clutch slip torque is increased by the transmission control system until the vehicles comes to a standstill.

14. A method according to claim 13 wherein the increase in the preselected value is controlled as a function of a gradient.

15. A method according to claim 13 wherein, during a reverse movement of the vehicle, the distance which is traveled backwards is determined by an evaluation in the transmission control system of a series of pulses supplied by a vehicle speed sensor wheel, and the clutch slip torque is increased above the preselected value to the extent that a controlled forward movement of the vehicle occurs until the distance which the vehicle traveled backwards has been compensated for.

16. A method according to claim 15 wherein, in an "undesired backward travel" operating mode, after a preselected value for the clutch slip torque has been set to the maximum possible value, the transmission control system applies pressure through a proportional valve to a locking shift element in the automatic transmission.

17. A method according to claim 1 wherein the clutch in the transmission is completely opened or is set to its lowest slip torque if a seat contact switch positioned in the driver's seat is activated.

18. A method according to claim 1 wherein the clutch is completely opened or set to its lowest slip torque if a door contact switch is opened.

19. A method according to claim 1 wherein the clutch is completely opened or set to its lowest slip torque if an engine hood switch is opened.

20. A method according to claim 1 wherein the clutch is completely opened or set to its lowest slip torque if a handbrake switch has been activated.

21. Apparatus for controlling the engagement of a clutch in a motor vehicle comprising:

a motor vehicle including a body, a drive system which includes an engine and an automatic transmission and is connected by resilient supports to the body of the motor vehicle, a differential connected to the drive system, axle shafts connected to the differential and to driven wheels having wheel brakes, a transmission control system which is connected to a control device for controlling the connection of the gear elements of the transmission;

at least one sensor for measuring (a) a displacement of the drive system with respect to the vehicle body or (b) the torque of a transmission output shaft or (c) a supporting force in or on the supporting bearings or (d) a throttle valve angle on an engine throttle valve, or (e) a brake light switch, or (f) the vehicle speed, wherein the transmission control system is responsive to signals from at least one of (a) a sensor for detecting the rotational speed of the engine, (b) a switch for determining the position of a selector lever of the automatic gearbox, (c) a manually settable activation element for setting a preselected value for the clutch slip torque, (d) a handbrake switch, (e) an engine hood switch, (f) a seat contact switch in the driver's seat, and (g) a door switch.

* * * * *